US007715873B1

(12) United States Patent
Biere et al.

(10) Patent No.: US 7,715,873 B1
(45) Date of Patent: May 11, 2010

(54) WEARABLE ACCESSORIES PROVIDING VISUAL INDICIA OF INCOMING EVENTS FOR WIRELESS TELECOMMUNICATIONS DEVICE

(75) Inventors: Devon Leon Biere, Olathe, KS (US);
Michael Arthur Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 608 days.

(21) Appl. No.: 11/426,229

(22) Filed: Jun. 23, 2006

(51) Int. Cl.
*H04B 1/38* (2006.01)
(52) U.S. Cl. .................. 455/557; 455/566; 455/418; 455/456.1; 455/569.1; 455/575.2
(58) Field of Classification Search .......... 455/557, 455/566, 418, 456.1, 569.1, 575.2
See application file for complete search history.

(56) References Cited

U.S. PATENT DOCUMENTS

| 5,912,653 | A | 6/1999 | Fitch |
| 5,929,777 | A | 7/1999 | Reynolds |
| 6,381,482 | B1 | 4/2002 | Jayaraman et al. |
| 6,714,233 | B2 * | 3/2004 | Chihara et al. ........... 348/14.02 |
| 6,757,719 | B1 | 6/2004 | Lightman et al. |
| 2002/0091843 | A1 | 7/2002 | Vaid |
| 2002/0156677 | A1 | 10/2002 | Peters et al. |
| 2002/0197960 | A1 | 12/2002 | Lee |
| 2004/0115430 | A1 | 6/2004 | Leonard |
| 2004/0192260 | A1 | 9/2004 | Sugimoto |
| 2004/0192335 | A1 | 9/2004 | Wong |
| 2005/0206616 | A1 | 9/2005 | Harary |
| 2005/0216346 | A1 | 9/2005 | Kusumoto et al. |
| 2007/0027673 | A1 | 2/2007 | Moberg |
| 2007/0060118 | A1 | 3/2007 | Guyette |
| 2007/0124721 | A1 | 5/2007 | Cowing |
| 2007/0216600 | A1 | 9/2007 | Langlois |

OTHER PUBLICATIONS

Leander Kahney, Video Clothes: 'Brand' New Idea, Wired News, Jun. 7, 2000, www.wired.com/news/technology/1,36698-0.html, Lycos, Inc.
France Telecom develops flexible display clothing, gizmag, www.gizmag.com/go/3043.
Nyx clothing offers built-in flexible display screens, gizmag, www.gizmag.com/go/3409.
Clayton Collins, 'Billboards' that walk, talk, and even flirt a little, The Christian Science Monitor, Jul. 8, 2004, www.csmonitor.com/2004/0708/p11s01-wmgn.html.
Randell, Cliff and Muier, Henk, The Shopping Jacket: Wearable Computing for the Consumer:, Personal Technologies (2000). pp. 4:241-244.

(Continued)

*Primary Examiner*—Nghi H Ly

(57) ABSTRACT

A wearable accessory may provide visual indicia of an incoming network event for a wireless telecommunications device. The wireless telecommunications device may detect the presence of the wearable accessory within a wireless personal area network. After detecting the presence of the wearable accessory, the wireless telecommunications device may determine the display type of the wearable accessory and if any interface software is required to properly communicate a signal to the wearable accessory. Upon receipt of an incoming network event, the wireless telecommunications device may send a signal to the wearable accessory based on the display type of the wearable accessory, thereby causing the wearable accessory to provide visual indicia of the incoming network event.

17 Claims, 5 Drawing Sheets

OTHER PUBLICATIONS

Office Action dated: Oct. 29, 2008 from U.S. Appl. No. 11/426,185, filed Jun. 23, 2006.
Office Action dated: Apr. 30, 2009 from U.S. Appl. No. 11/426,217, filed Jun. 23, 2006.
Office Action dated: Oct. 29, 2008 from U.S. Appl. No. 11/426,217, filed Jun. 23, 2006.
Office Action dated: Apr. 2, 2009 from U.S. Appl. No. 11/406,959, filed Apr. 19, 2006.
Office Action dated: Oct. 15, 2008 from U.S. Appl. No. 11/406,959, filed Apr. 19, 2006.
Office Action dated: Jul. 9, 2009 from U.S. Appl. No. 11/426,228, filed Jun. 23, 2006.
A New Way to Ride, SGMAG.com Gear website http://www.sgmag.com/hear/burton/, printed Feb. 16, 2006, 3 pages.
Carey Goldberg, Getting Wired Could Help Predict Emotions, The Boston Globe website http://www.boston.com/yourlife/health/mental/articles/2005/06/13/getting_wired_could_help_predict_emotions?mo... , Jun. 13, 2005, 3 pages.
D. Marculescu et al., Electronic Textiles: A Platform for Pervasive Computing, Proceedings of the IEEE, Dec. 2003, pp. 1993-2018, vol. 91, No. 12.
E.R. Post et al. E-Broidery: Design and Fabrication of Textile-Based Computing, IBM Systems Journal, 2000, pp. 840-860, vol. 39, Nos. 3&4 EFSWeb2.1.16
Rick Merritt, Darpa Kick Starts Wearable Computer Initiative, website http://www.eetimes.com/story/OEG20011101S0054, printed Feb. 16, 2006, 5 pages.
When Style and Comfort are not Enough, Virginia Tech web article http://www.ecpe.v1.edu/news/ar04/hokie.html, Apr. 2004, 4 pages.
Office Action dated Oct. 5, 2009 from U.S. Appl. No. 11/426,217, filed Jun. 23, 2006.
Office Action dated Sep. 17, 2009 from U.S Appl. No. 11/406,959, filed Apr. 19, 2006.
Final Office Action from U.S. Appl. No. 11/426,228 dated Feb. 3, 2010, 23 pgs.

* cited by examiner

WEARABLE ACCESSORIES PROVIDING VISUAL INDICIA OF INCOMING EVENTS FOR WIRELESS TELECOMMUNICATIONS DEVICE

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

This invention relates to wearable accessories capable of providing visual indicia of incoming network events for a wireless telecommunications device. More specifically, the invention relates to coordinating multiple wearable accessories having different display types for providing visual indicia of incoming network events for a wireless telecommunications device.

BACKGROUND

As technology develops, consumer electronics are continuing to get smaller and more mobile while their technical capabilities grow. For instance, a wide variety of portable, personal devices are currently available to consumers, including digital cameras, video cameras, music players, personal data assistants, global positioning system devices, and mobile phones to name a few. While the technical capabilities of such devices continue to grow exponentially, users also seek devices that are aesthetically pleasing. In particular, users often wish to have a more personalized experience. As a result, there is a trend in the electronics and computer industries to make technology more fashionable by integrating electronic devices with clothing, jewelry, and other accessories that users may wear, thereby allowing users to express themselves through their electronic devices.

With respect to wireless telecommunications devices, such as mobile phones, the capabilities of these devices continue to grow, and the devices can provide a rich experience for users. Additionally, users may currently personalize their experiences with mobile phones in a number of ways, such as, for instance, by having the mobile phone play different ring tones for various incoming network events (e.g., when receiving phones calls, text messages, email, voice mail, digital still images, and video images). However, users may wish to further personalize their experiences with wireless telecommunications devices. The current state of the art could be advanced if users could have multiple wearable accessories with varying display types that could provide visual indicia of incoming network events for wireless telecommunications devices.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are directed to coordinating wearable accessories having different display types capable of providing visual indicia of incoming network events for a wireless telecommunications device. Thus, in one aspect, an embodiment of the present invention relates to a method on a wireless telecommunications device for coordinating communication with a wearable accessory to provide visual indicia of an incoming network event received on the wireless telecommunications device from a wireless telecommunications network. The method includes detecting the presence of a wearable accessory within a wireless personal area network of the wireless telecommunications device. The method also includes requesting a display type of the wearable accessory and receiving a response from the wearable accessory providing an indication of the display type of the wearable accessory. The method further includes determining whether one or more interface parameters are available on the wireless telecommunications device for the display type of the wearable accessory. The method still further includes obtaining the interface parameters if the interface parameters are not available on the wireless telecommunications device for the display type of the wearable accessory.

In another embodiment, an aspect of the invention is directed to a method for providing visual indicia of an incoming network event received on a wireless telecommunications device from a wireless telecommunications network, wherein the visual indicia is provided by a wearable accessory communicating with the wireless telecommunications device over a wireless personal area network. The method includes detecting the presence of the wearable accessory within the wireless personal area network of the wireless telecommunications device. The method also includes determining a display type of the wearable accessory. The method further includes receiving an incoming network event from the wireless telecommunications network. The method still further includes in response to the incoming network event, providing a signal to the wearable accessory based on the display type of the wearable accessory, wherein the wearable accessory provides a visual indicia of the incoming network event based on the signal.

In a further aspect of the invention, an embodiment is directed to a system for providing visual indicia of an incoming network event for a wireless telecommunications device. The system includes a wireless telecommunications device in communication with a wireless telecommunications network via a long-range radio frequency interface. The wireless telecommunications device is capable of receiving an incoming network event from the wireless telecommunications network over the long-range radio frequency interface and is also capable of communicating over a wireless personal area network. The system also includes a wearable accessory in communication with the wireless telecommunications device via the wireless personal area network. The wearable accessory has a display and is capable of providing visual indicia of the incoming network event for the wireless telecommunications device. The wearable accessory is also capable of communicating a display type to the wireless telecommunications device and the wireless telecommunications device is capable of communicating a signal to the wearable accessory in response to the incoming network event. The signal is based on the display type and causes the wearable accessory to provide visual indicia of the incoming network event.

BRIEF DESCRIPTION OF THE SEVERAL VIEWS OF THE DRAWINGS

The present invention is described in detail below with reference to the attached drawing figures, which are incorporated by reference herein and wherein.

DETAILED DESCRIPTION

Figure 1:
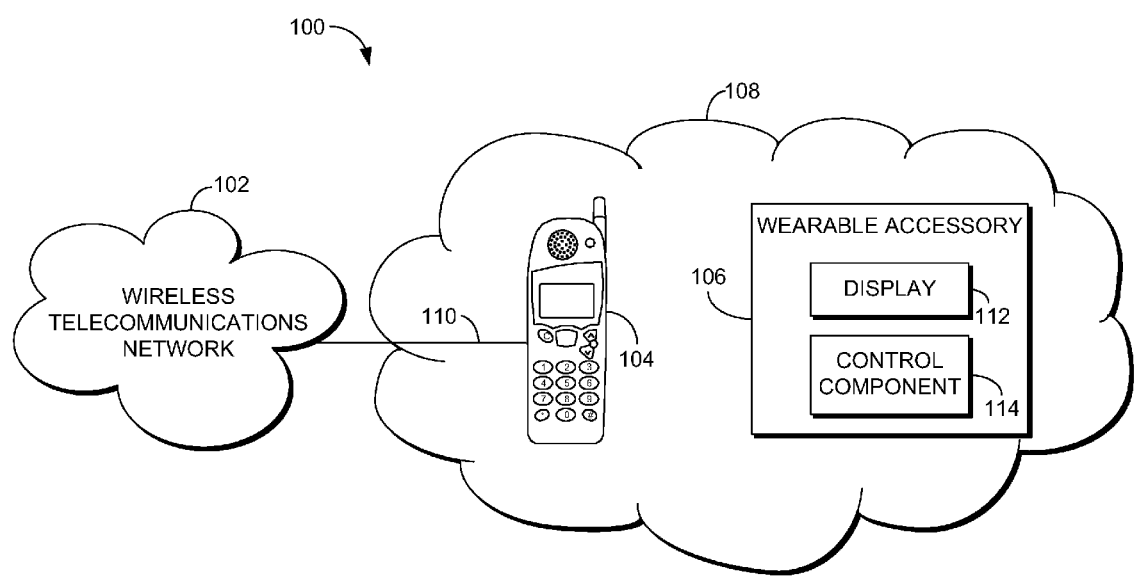
FIG. 1 is a block diagram of an exemplary system architecture suitable for use in implementing an embodiment of the present invention.

Embodiments of the present invention permit, among other things, a user to have multiple wearable accessories having different display types that are capable of providing visual indicia of incoming network events received on a wireless telecommunications device from a wireless telecommunications network. Each wearable accessory may comprise an accessory item, such as, for instance, an article of clothing, an article of jewelry, or a bag, that has some form of display for providing visual indicia of an incoming network event for a wireless telecommunications device. The display type may vary greatly among various wearable accessories from complex displays (e.g., LCDs that may provide videos) to simple displays (e.g., LEDs that may provide simple blinking patterns). As used herein, the term "display type" refers to the type of display incorporated within a wearable accessory and/or one or more capabilities or characteristics of a display incorporated within a wearable accessory.

In an embodiment, when a user's wearable accessory is within the range of a wireless personal area network of the user's wireless telecommunications device, the wireless telecommunications device determines the display type of the wearable accessory. When the wireless telecommunications device receives an incoming network event from the wireless telecommunications network, the wireless telecommunications device may transmit a signal to the wearable accessory, thereby causing the wearable accessory to provide visual indicia of the incoming network event. The signal is based on the display type of the wearable accessory.

In another embodiment, a user's wearable accessory may await events from the user's wireless telecommunications device. When the user's wireless telecommunications device receives an incoming network event, the wireless telecommunications device sends a signal in response to the network event. The wearable accessory acts upon the signal, if the wearable accessory is capable of doing so, to provide a visual indicia of the incoming network event for the wireless telecommunications device.

As one skilled in the art will appreciate, the present invention may be embodied as, among other things: a method, system, or computer-program product. Accordingly, the present invention may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 1, a block diagram is shown of an exemplary system 100 in which exemplary embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

As shown in FIG. 1, system 100 may include, among other components not shown, a wireless telecommunications network 102, a wireless telecommunications device 104, and a wearable accessory 106. By employing the system 100, the wearable accessory 106 may provide visual indicia of incoming network events for the wireless telecommunications device 104. The incoming network events are received by the wireless telecommunications device 104 from the wireless telecommunications network 102.

The wireless telecommunications device 104 may generally be any type of device for communicating via a wireless telecommunications network, such as the wireless telecommunications network 102. By way of example only and not limitation, the telecommunications device 104 may be a cell phone or mobile phone. The wireless telecommunications device 104 may communicate with the wireless telecommunications network 102 over a long-range radio frequency (RF) interface 110. The wireless telecommunications device 104 may both transmit and receive RF signals over the long-range RF interface 110. The communication may occur in a digital format, such as CDMA, TDMA, GSM, or may occur in an analog format, such as AMPS.

The wireless telecommunications device 104 may be capable of receiving a variety of incoming network events from the wireless telecommunications network 102. By way of example only and not limitation, the incoming network events may include voice calls, short message service (SMS) messages, text messages, multimedia messages, alerts, game events, instant messages, chat messages, push-to-talk messages, downloads, datagrams, internet data packets, data transmissions, socket communications, remote procedure calls, emails, and voicemail. In embodiments of the invention, wearable accessories, such as the wearable accessory 106, may communicate with the wireless telecommunications device 104 and provide a visual indicia of an incoming network event for the wireless telecommunications device 104. The wireless telecommunications device 104 and wearable accessory 106 may communicate via a wireless personal area network (PAN) 108. The wireless PAN 108 may allow communication via a short-range RF interface. The communication may comply with Bluetooth, ZigBee, or other standards for short-range wireless communications.

The wearable accessory 106 may comprise an accessory item, such as, for instance, an article of clothing (e.g., a hat, shirt, belt buckle, etc.) or a piece of jewelry (e.g., a ring, necklace, bracelet, earrings, etc.), that has an integrated display 112 and control component 114. The display 112 may include any type of device capable of providing some visual indicia of an incoming network event for the wireless telecommunications device 104. By way of example only and not limitation, the display 112 may comprise one or more liquid crystal displays (LCDs), light emitting diodes (LEDs), organic light emitting diodes (OLEDs), and/or electronic textiles that have display properties. Depending on the type and complexity of the display 112, the visual indicia provided for an incoming network event may include, for instance, a video, an image, text, or a blinking pattern. In some embodiments, the wearable accessory 106 may also include one or more speakers (not shown) for providing audio indicia of an incoming network event.

Figure 2:
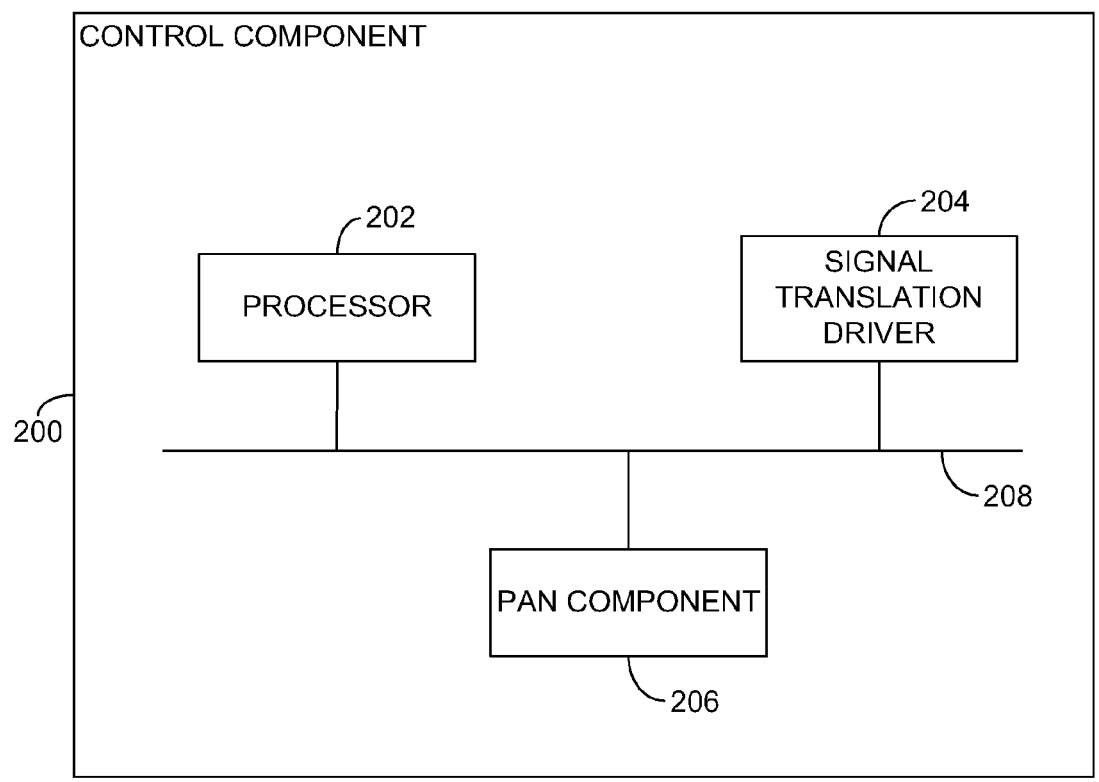
FIG. 2 is a block diagram of an exemplary control component for a wearable accessory in accordance with an embodiment of the present invention.

The control component 114 generally provides for communication with the wireless telecommunications device 104 and controls the display 112 based on the communication of an incoming network event for the wireless telecommunications device 104. A block diagram of an exemplary control component 200 is shown in FIG. 2. The exemplary control component 200 generally includes a processor 202, a signal translation driver 204, a PAN component 206, and data storage (not shown) all of which may be communicatively linked by a system bus 208. The control component 114 may include a suite of software that includes the software infrastructure required to support the sending and receiving of data through the wireless PAN. The control component may also include a battery or cabling to connect the unit to a power source.

The processor 202 may comprise one or more processors that read data from various components and operate to coordinate various functions of the control component 200 as described herein. The signal translation driver 204 converts the processor outputs into electronic signal levels that can be used by the accessory to cause a display effect. An example of a display effect is the capability to display text upon an electronic textile. The signal translation driver 204 is also responsible for the translation of electronic signals into signal levels that the processor 202 can interpret.

The PAN component 206 provides short-range wireless communications between the control component 200 and a wireless telecommunications device, such as the wireless telecommunications device 104 of FIG. 1. The PAN component 206 may communicate via Bluetooth, ZigBee, or other standards for short-range wireless communications.

A user may own a number of wearable accessories capable of providing visual indicia of incoming network events for the user's wireless telecommunications device. Each of the wearable accessories may have a different type of display with different display capabilities. For instance, a user may own a shirt having an integrated LCD capable of displaying video images, still images, and the like. Additionally, the user may own a ring having one or more LEDs that may only be capable of providing simple blinking patterns.

Figure 3:
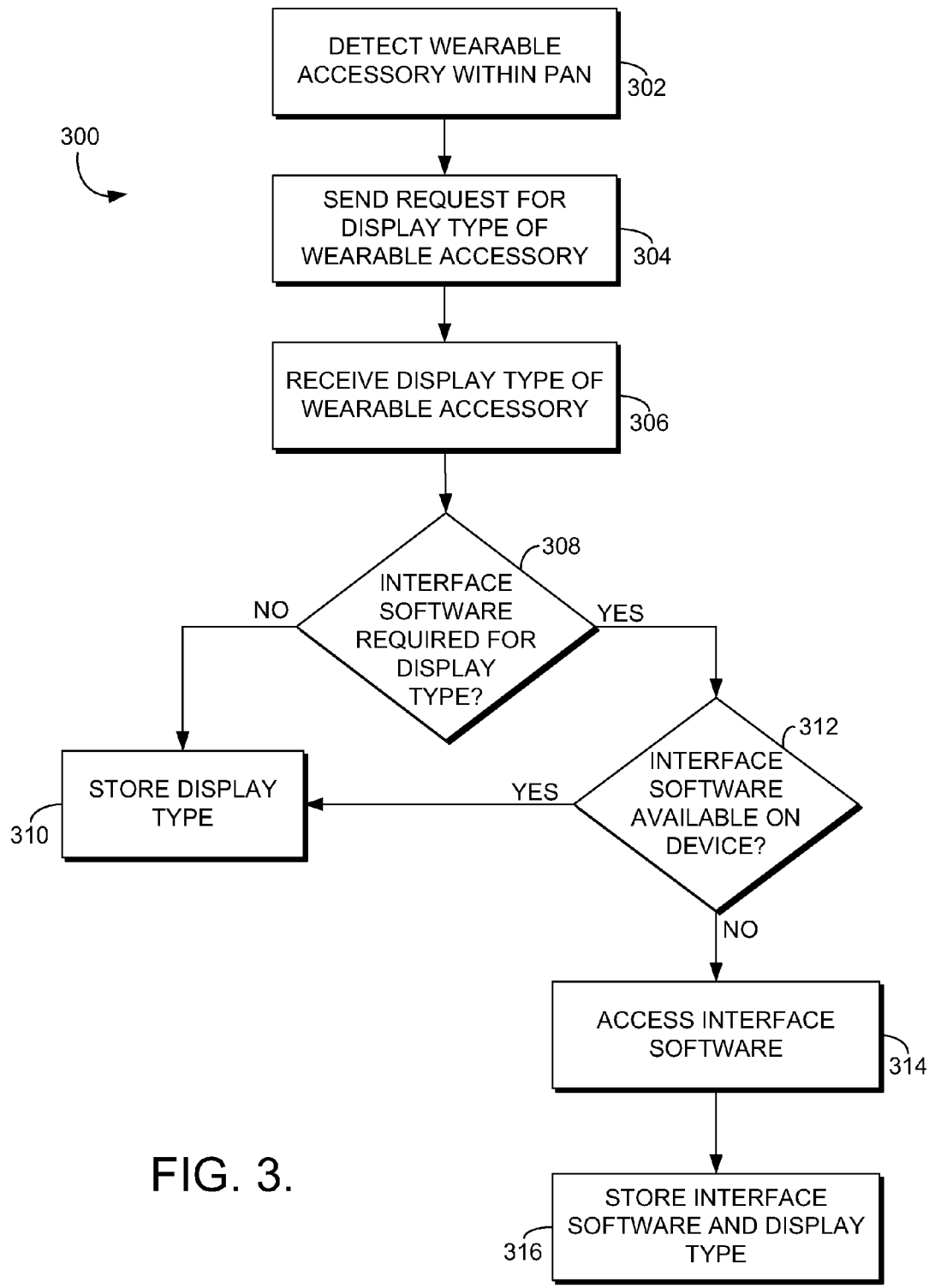
FIG. 3 is flow diagram showing an exemplary method for discovering the display type of a wearable accessory in accordance with an embodiment of the present invention.

In an embodiment, when a wireless telecommunications device detects that a wearable accessory is within the PAN of the wireless telecommunications device, the wireless telecommunications device may communicate with the wearable accessory to determine the display type and capabilities of the wearable accessory. Referring now to FIG. 3, a flow diagram is provided illustrating a method 300 for coordinating communication between a wireless telecommunications device and a wearable accessory capable of providing visual indicia of an incoming network event for the wireless telecommunications device.

Initially, as shown at block 302, the wireless telecommunications device detects the presence of a wearable accessory within the range of its PAN. After detecting the wearable accessory, the wireless telecommunications device sends a request to the wearable accessory to determine the display type of the wearable accessory, as shown at block 304. The wearable accessory responds to the request by providing information regarding the display type of the wearable accessory, as shown at block 306.

In some cases, specific interface software may be required on the wireless telecommunications device to operate the wearable accessory. The interface software may comprise interface parameters setting forth how signals are sent from the wireless telecommunications device to the wearable display to cause the wearable display to provide visual indicia of incoming network events. The wireless telecommunications device will require software that identifies network application and handset events and instantiates a short-range wireless interface with a wearable accessory with the wireless PAN. Accordingly, a determination is made regarding whether interface software is required for the display type of the wearable accessory, as shown at block 308. If interface software is not required, the wireless telecommunications device stores the display type of the wearable accessory, as shown at block 310. If interface software is required for the display type, the wireless telecommunications device determines whether the software is already installed on the device, as shown at block 312. If the interface software is already installed, the wireless telecommunications device merely stores the display type, as shown at block 310. If the interface software is not already installed on the wireless telecommunications device, the device accesses the interface software, as shown at block 314. For instance, the wireless telecommunications device may access the interface software by requesting and downloading the software from a network server, such as a server on the Internet. The wireless telecommunications device then stores the interface software and display type for the wearable accessory, as shown at block 316.

Figure 4:
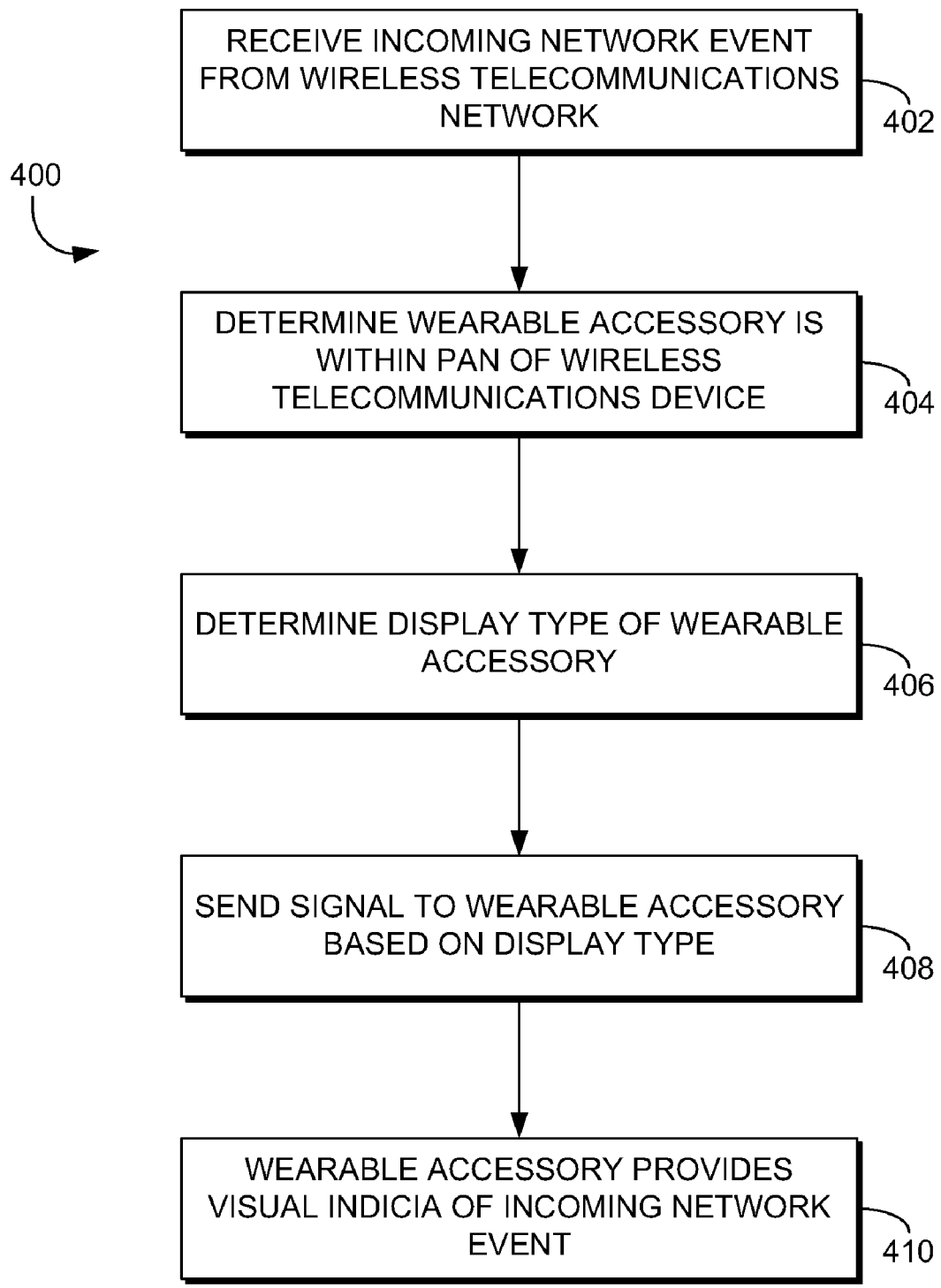
FIG. 4 is a flow diagram showing an exemplary method for using a wearable accessory to provide visual indicia of an incoming network event for a wireless telecommunications device in accordance with an embodiment of the present invention.

Turning now to FIG. 4, a flow diagram is illustrated showing an exemplary method 400 for using a wearable accessory to provide visual indicia of an incoming network event for a wireless telecommunications devices in accordance with an embodiment of the present invention. As shown at block 402, the wireless telecommunications device receives an incoming network event from a wireless telecommunications network. By way of example only and not limitation, the incoming network event may comprise an incoming voice call, short message service (SMS) message, text message, multimedia message, alert, game event, instant message, chat message, push-to-talk message, download, datagram, internet data packet, data transmission, socket communication, remote procedure call, email, or a voicemail At block 404, the wireless telecommunications device determines that a wearable accessory capable of providing visual indicia of an incoming network event is within the PAN of the wireless telecommunications device. Additionally, the wireless telecommunications device determines the display type of the wearable accessory, as shown at block 406. In some embodiments, the wireless telecommunications device may have, prior to receiving the incoming network event, detected the presence of the wearable accessory within the PAN and determined and stored the display type of the wearable accessory, such as previously described for the method 300 with reference to FIG. 3. In such embodiments, the wireless telecommunications device may access the stored display type. In other embodiments, the wireless telecommunications device may detect the presence of the wearable accessory and/or determine the display type of the wearable accessory by communicating with the wearable accessory after receiving the incoming network event. Any and all such variations are contemplated to be within the scope of embodiments of the present invention.

The wireless telecommunications device sends a signal to the wearable accessory based on the display type of the wearable accessory, as shown at block 408. In response to receiving the signal, the wearable accessory provides visual indicia of the incoming network event for the wireless telecommunications device, as shown at block 410.

In another embodiment, a wireless telecommunications device may automatically send a signal in response to an incoming network event without determining the presence and/or display type of a wearable accessory within the wireless PAN of the wireless telecommunications device. In such an embodiment, a wearable accessory waits for signals from a wireless telecommunications device indicating an incoming network event, and provides visual indicia only for those events that it is capable of doing so. For instance, when a wireless telecommunications device receives an incoming network event, it may share a media file to be presented by a wearable accessory that has the capability of presenting the media (e.g., a video). A light and character display accessory would not react to the file exchange and play request, but a wearable accessory with a flat screen display (and storage) would react.

Figure 5:
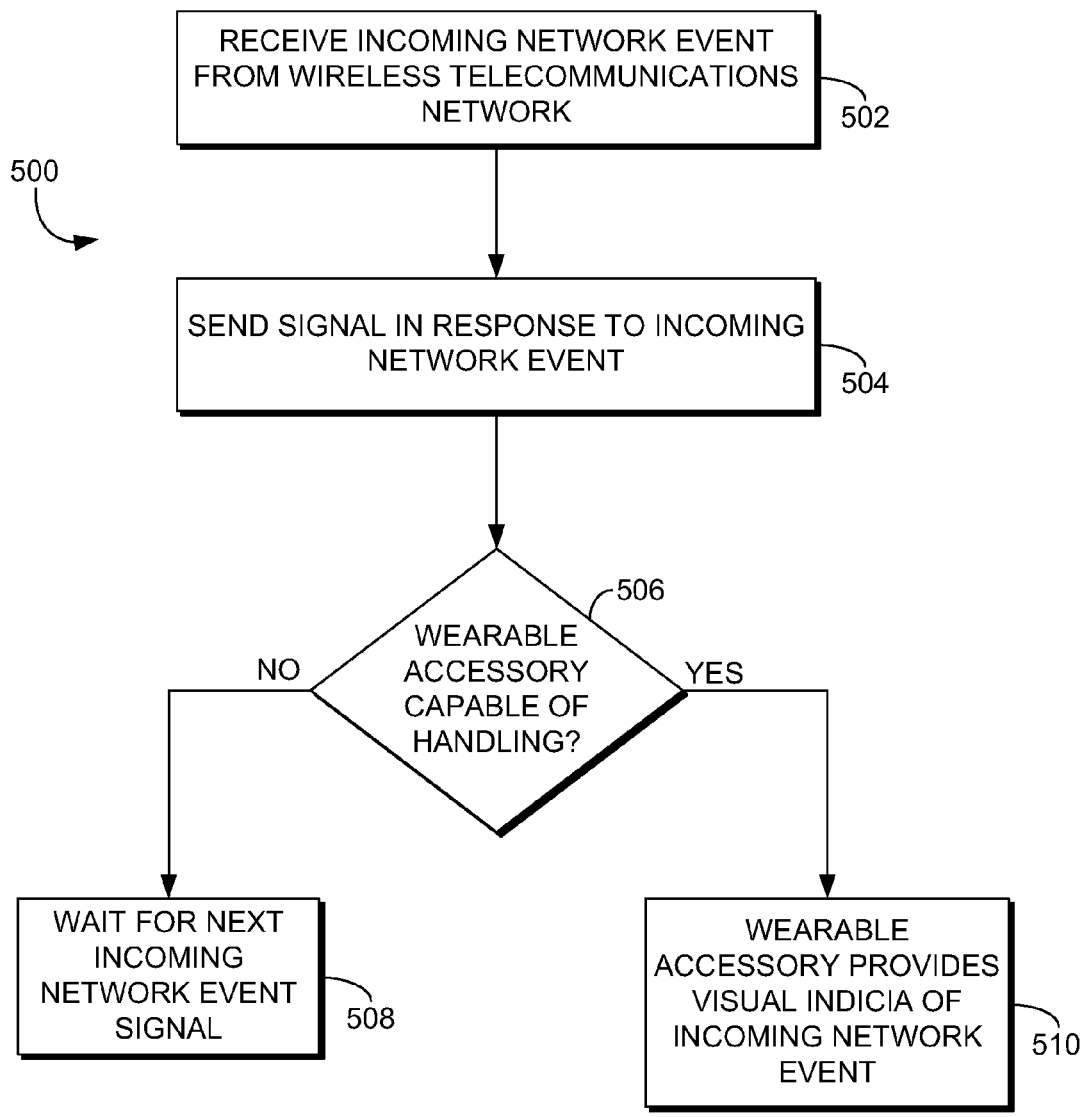
FIG. 5 is a flow diagram showing an exemplary method for using a wearable accessory to provide visual indicia of an incoming network event for a wireless telecommunications device in accordance with another embodiment of the present invention.

Accordingly, referring now to FIG. 5, a flow diagram is provided showing an exemplary method 500 for using a wearable accessory to provide visual indicia of an incoming net work event for a wireless telecommunications devices in accordance with another embodiment of the present invention. As shown at block 502, the wireless telecommunications device receives an incoming network event from a wireless telecommunications network. By way of example only and not limitation, the incoming network event may comprise an incoming voice call, short message service (SMS) message, text message, multimedia message, alert, game event, instant message, chat message, push-to-talk message, download, datagram, internet data packet, data transmission, socket communication, remote procedure call, email, or a voicemail In response to the incoming network event, the wireless telecommunications device sends a signal to cause a wearable accessory to provide visual indicia of the incoming network event, as shown at block 504. In some cases, the type of signal provided by the wireless telecommunications device may depend on the type and/or details of the network event. For instance, a user may wish to have a video played for incoming calls and simple light presentations for voice mail. Further, different types of videos could be played for incoming calls depending on the caller. Any and all such variations are contemplated to be within the scope of embodiments of the present invention.

As shown at block 506, a wearable accessory within the wireless PAN of the wireless telecommunications device determines whether it is capable of reacting to the signal. If the wearable accessory is not capable of reacting to the signal, the wearable accessory continues to await signals and events that is capable of handling, as shown at block 508. Referring to the above example, if the wireless telecommunications device attempts to share a video file and the wearable accessory is a light and character display accessory, the wearable accessory will not react. Alternatively, if the wearable accessory is capable of reacting to signal, the wearable accessory provides visual indicia of the incoming network event for the wireless telecommunications device, as shown at block 510. Referring again to the above example in which the wireless telecommunications device attempts to share a video file, if the wearable accessory includes a flat screen display and memory, the wearable accessory may be capable of presenting the video.

As can be seen, embodiments of the present invention relate to coordinating wearable accessories having different display types capable of providing visual indicia of incoming network events for a wireless telecommunications device. Many different arrangements of the various components depicted, as well as components not shown, are possible without departing from the spirit and scope of the present invention.

The present invention has been described in relation to particular embodiments, which are intended in all respects to be illustrative rather than restrictive. Alternative embodiments will become apparent to those skilled in the art that do not depart from its scope. Many alternative embodiments exist but are not included because of the nature of this invention. A skilled programmer may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method on a wireless telecommunications device for coordinating communication with a wearable accessory to provide visual indicia of an incoming network event received on the wireless telecommunications device from a wireless telecommunications network, the method comprising:

detecting the presence of a wearable accessory within a wireless personal area network of the wireless telecommunications device;

requesting a display type of the wearable accessory, wherein the display type of the wearable accessory is one of a plurality of different display types capable of providing visual indicia of an incoming network event;

receiving a response from the wearable accessory providing an indication of the display type of the wearable accessory;

determining whether one or more interface parameters are available on the wireless telecommunications device for the display type of the wearable accessory, wherein the one or more interface parameters define data, corresponding to the display type of the wearable accessory, communicated from the wireless telecommunications device to the wearable accessory to cause the wearable accessory to provide visual indicia of the incoming network event;

when one or more interface parameters are not available on the wireless telecommunications device for the display type of the wearable accessory, obtaining the one or more interface parameters; and upon receiving an incoming network event, sending a signal to the wearable accessory using the one or more interface parameters, the signal causing the wearable accessory to provide visual indicia of the incoming network event.

2. The method of claim 1, wherein the wireless telecommunications device comprises at least one of a cell phone and a mobile phone.

3. The method of claim 1, wherein the wearable accessory comprises at least one of an article of clothing and an article of jewelry having a display and control component.

4. The method of claim 1, wherein the display type comprises at least one of a liquid crystal display, a light emitting diode, an organic light emitting diode, and an electronic textile that has display properties.

5. The method of claim 1, wherein the incoming wireless telecommunications network event comprises at least one of a voice call, a short message service (SMS) message, a text messages, a multimedia message, an alert, a game events, an instant message, a chat message, a push-to-talk message, a download, a datagram, an internet data packets, a data transmission, a socket communication, a remote procedure call, an email, and a voicemail.

6. The method of claim 1, wherein obtaining one or more interface parameters comprises downloading the one or more interface parameters from a network component accessible via the Internet.

7. One or more computer-readable media having computer-useable instructions embodied thereon for performing the method of claim 1.

8. One or more computer storage media having computer executable instructions embodied thereon that when executed perform a method for providing visual indicia of an incoming network event received on a wireless telecommunications device from a wireless telecommunications network, wherein the visual indicia is provided by a wearable accessory communicating with the wireless telecommunications device over a wireless personal area network, the method comprising:

detecting the presence of the wearable accessory within the wireless personal area network of the wireless telecommunications device;

determining a display type of the wearable accessory, wherein the display type of the wearable accessory is one of a plurality of different display types capable of providing visual indicia of an incoming network event;

receiving an incoming network event from the wireless telecommunications network; and in response to the incoming network event, providing a signal to the wearable accessory based on the display type of the wearable accessory, wherein the wearable accessory provides a visual indicia of the incoming network event based on the signal.

9. The computer storage media of claim 8, wherein the wireless telecommunications device comprises at least one of a cell phone and a mobile phone.

10. The computer storage media of claim 8, wherein the wearable accessory comprises at least one of an article of clothing and an article of jewelry having a display and control component.

11. The computer storage media of claim 8, wherein the display type comprises at least one of a liquid crystal display, a light emitting diode, an organic light emitting diode, and an electronic textile that has display properties.

12. The computer storage media of claim 8, wherein the incoming wireless telecommunications network event comprises at least one of a voice call, a short message service (SMS) message, a text messages, a multimedia message, an alert, a game events, an instant message, a chat message, a push-to-talk message, a download, a datagram, an internet data packets, a data transmission, a socket communication, a remote procedure call, an email, and a voicemail.

13. A system for providing visual indicia of an incoming network event for a wireless telecommunications device, the system comprising:

a wireless telecommunications device in communication with a wireless telecommunications network via a long-range radio frequency interface, the wireless telecommunications device being configured to receive an incoming network event from the wireless telecommunications network over the long-range radio frequency interface, the wireless telecommunications device also being configured to communicate over a wireless personal area network;

a wearable accessory in communication with the wireless telecommunications device via the wireless personal area network, the wearable accessory having a display and being configured to provide visual indicia of the incoming network event for the wireless telecommunications device; and wherein the wearable accessory is configured to communicate a display type to the wireless telecommunications devices, wherein the display type of the wearable accessory is one of a plurality of different display types capable of providing visual indicia of an incoming network event and the wireless telecommunications device is configured to communicate a signal to the wearable accessory in response to the incoming network event, the signal being based on the display type and causing the wearable accessory to provide visual indicia of the incoming network event.

14. The system of claim 13, wherein the wireless telecommunications device comprises at least one of a cell phone and a mobile phone.

15. The system of claim 13, wherein the wearable accessory comprises at least one of an article of clothing and an article of jewelry having a display and control component.

16. The system of claim 13, wherein the display type comprises at least one of a liquid crystal display, a light emitting diode, an organic light emitting diode, and an electronic textile that has display properties.

17. The system of claim 13, wherein the incoming wireless telecommunications network event comprises at least one of a voice call, a short message service (SMS) message, a text messages, a multimedia message, an alert, a game events, an instant message, a chat message, a push-to-talk message, a download, a datagram, an internet data packets, a data transmission, a socket communication, a remote procedure call, an email, and a voicemail.

* * * * *